Oct. 25, 1932.  W. STUEBING, JR  1,884,358
LIFT TRUCK
Filed Dec. 31, 1930  4 Sheets-Sheet 1
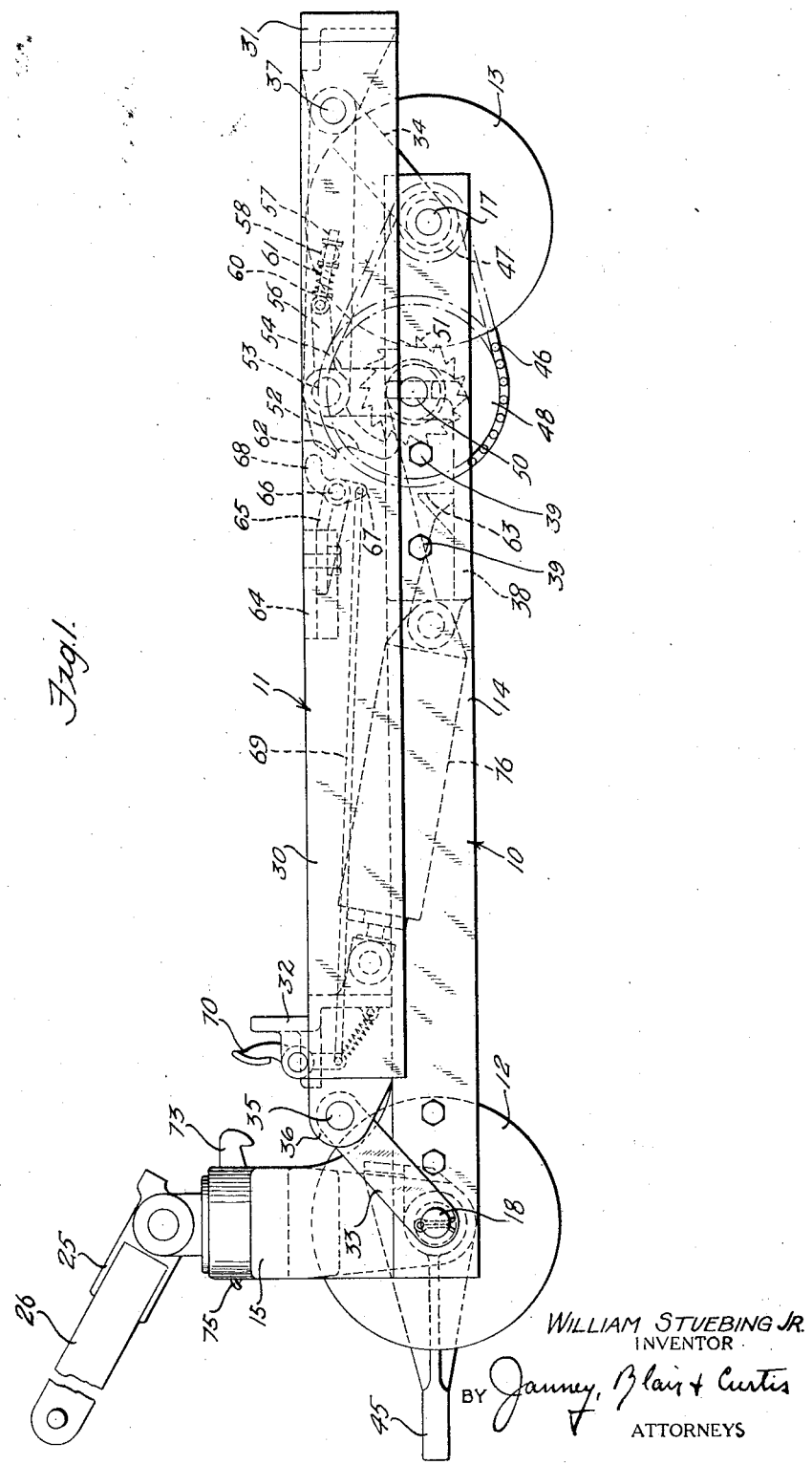
WILLIAM STUEBING JR.
INVENTOR
BY Janney, Blair & Curtis
ATTORNEYS

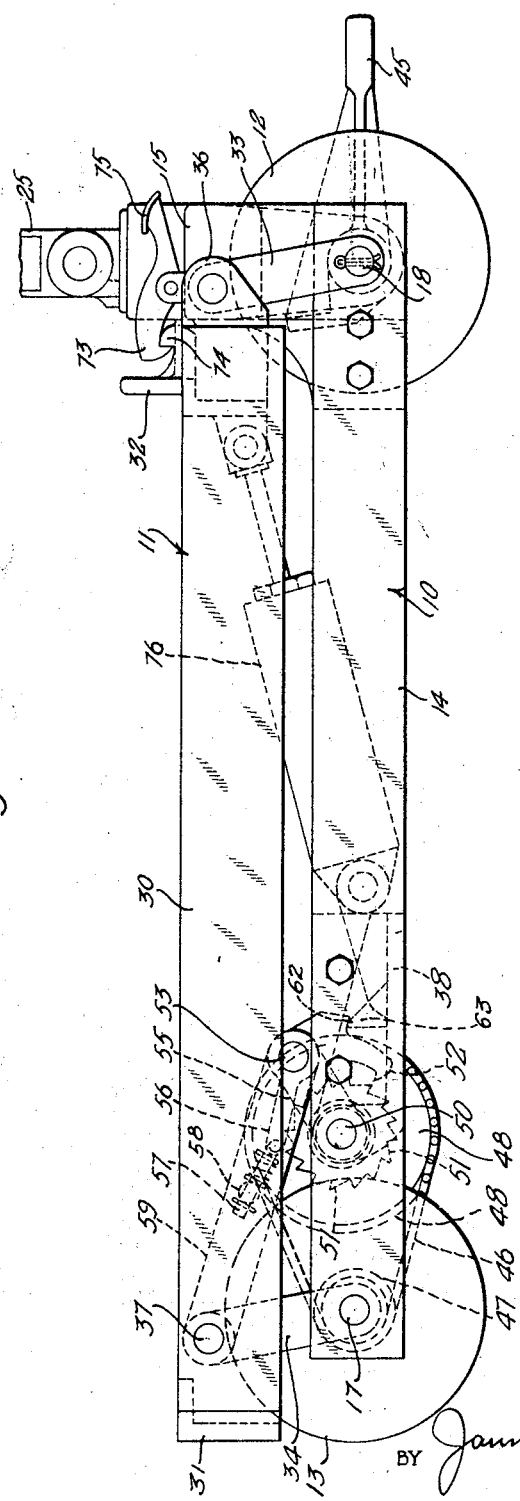

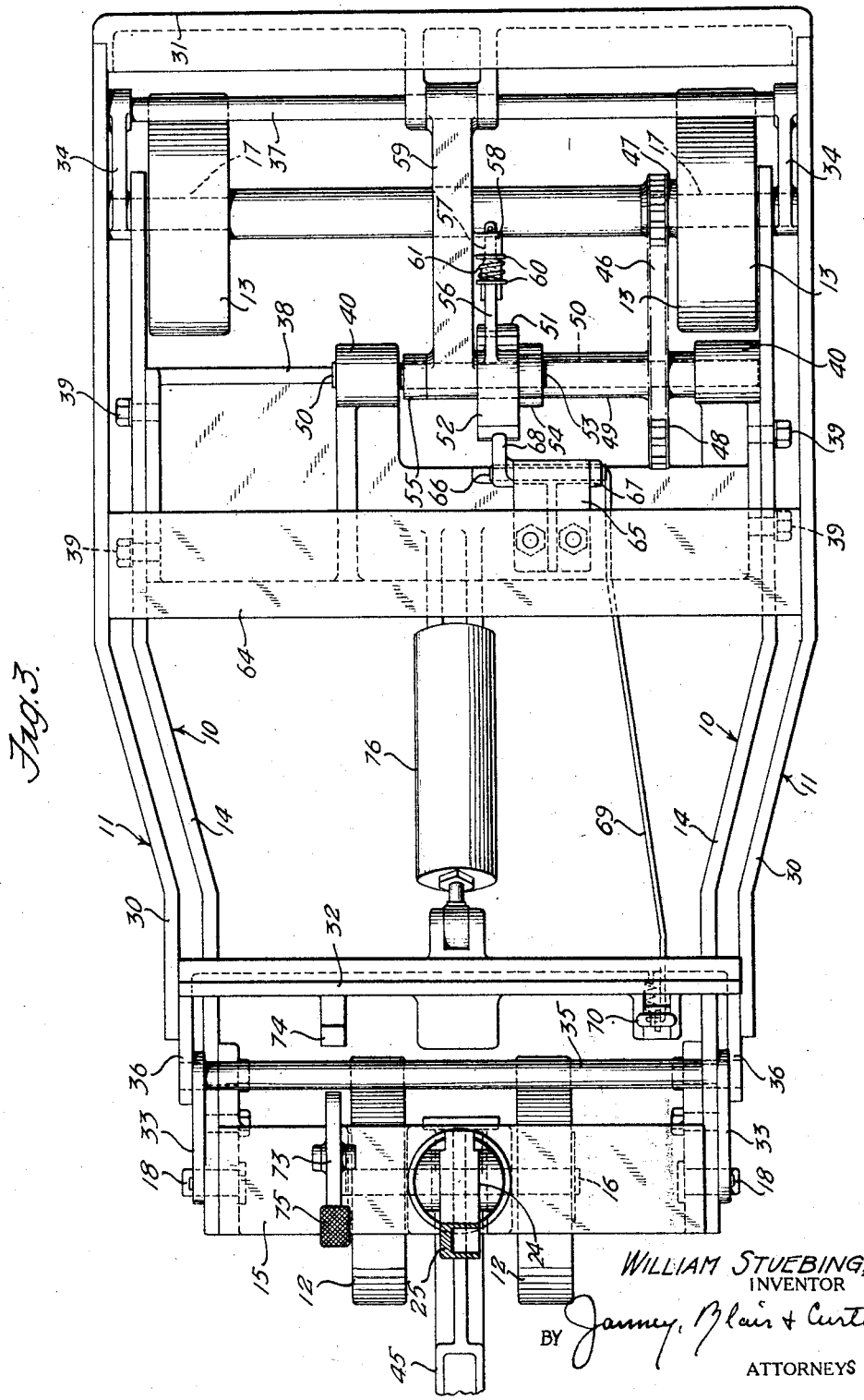

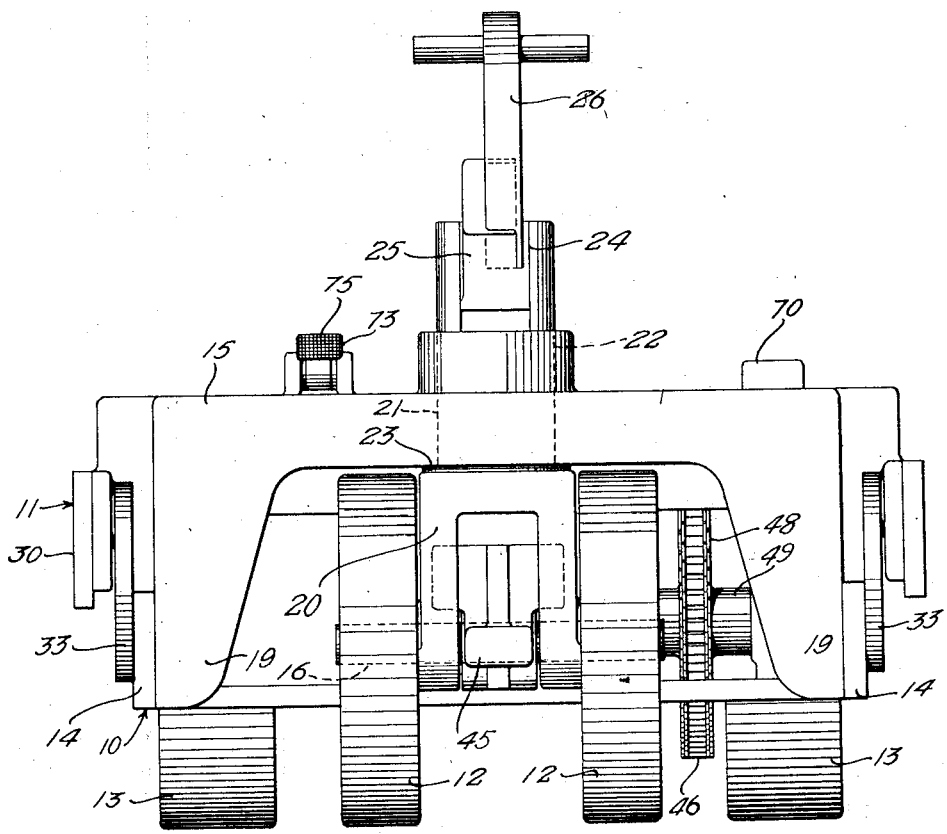

Patented Oct. 25, 1932

1,884,358

UNITED STATES PATENT OFFICE

WILLIAM STUEBING, JR., OF CINCINNATI, OHIO, ASSIGNOR TO THE YALE & TOWNE MANUFACTURING COMPANY, OF STAMFORD, CONNECTICUT, A CORPORATION OF CONNECTICUT

LIFT TRUCK

Application filed December 31, 1930. Serial No 505,819.

This invention relates to vehicles and particularly trucks of the lift type in which the body or load carrying platform may be raised and lowered relative to the supporting frame to facilitate loading and unloading.

One of the objects is to provide a truck of this character which is simple, compact and durable in construction, and which may be economically produced and operated.

Another object is to provide a vehicle of this type which is capable of being easily maneuvered and operated in restricted or inaccessible places.

These and other objects, general and particular, may best be appreciated by reference to the accompanying drawings, wherein Fig. 1 is a side elevation as viewed from the left of the vehicle, the platform or body being in lowered position;

Fig. 2 is the same as Fig. 1, except that the vehicle is viewed from the right side and the platform is in raised position;

Fig. 3 is a plan view, and

Fig. 4 is a slightly enlarged front elevation.

Referring to the drawings, the particular illustrative embodiment shown is what is generally known as a trailer truck which may be attached to and drawn by a tractor or other power driven vehicle. No power unit is mounted on the truck but the rolling action of the wheels is utilized to actuate the lifting mechanism as the truck is being drawn by such tractor. For clarity of illustration only the truck chassis is shown as it will be evident that any suitable platform or body may be mounted thereon.

Referring particularly to Fig. 3, the chassis comprises a main or stationary frame 10 and a lifting frame 11 mounted thereon. The frame 10 is supported by suitable front wheels 12 and rear wheels 13 and comprises side rails 14, a head 15, a front axle 16 and a rear axle 17. The side rails are connected to the head 15 by any suitable means such as pins 18 mounted in the depending portions 19 (Fig. 4) of such head. The rear axle 17 is mounted in the rear extremities of the side rails 14 and extends therebetween.

Referring to Fig. 4, the front axle is mounted in a fork 20 having a cylindrical column 21 extending upwardly through a correspondingly formed bearing 22 in the head 15. This head is supported by a shoulder 23 on the fork and the fork is revoluble within the head to permit steering of the truck. The upper extremity of the column 21 is slotted as at 24 to receive a handle housing 25 for a handle 26 by means of which the truck may be steered.

Referring to Fig. 3, the lifting frame 11 comprises side rails 30 connected at their rear extremities by a tie bar 31 and near their front ends by a saddle 32. This frame is connected to the main frame 10 on opposite sides thereof by front links 33 and rear links 34. The front links 33 have their lower extremities pivotally mounted on the corresponding pins 18 and their upper extremities similarly connected to a link shaft 35 supported in forwardly projecting ends 36 of the saddle 32. The rear links have their upper extremities pivotally mounted on a link shaft 37 connecting the side rails 30 of the frame 11 and their lower extremities similarly mounted on the rear axle 17. Revolution of the links about the axis of the shaft 17 and pins 18 causes the frame 11 to be raised or lowered relative to the main frame 10. Substantially midway between their ends, the side rails 14 of the frame 10 are connected by a check beam 38 secured thereto by bolts as 39 or in any other suitable manner. Mounted upon the front axle 16 is a trailer connection or draw bar 45 adapted to be attached at its outer end to a tractor or other vehicle by which the truck may be drawn.

The lifting of the platform is accomplished by the rolling action of the wheels. The mechanism for this purpose is located near the rear axle and operated by a chain as 46 passing over a sprocket as 47 fixed on such axle. This chain drives a corresponding sprocket 48 on a sleeve 49 revoluble on a cross shaft 50 supported in suitable members 40 on the check beam 38. Fixed on this sleeve is a ratchet 51 which is adapted to be engaged by a pawl 52 mounted on a shaft 53 having its ends supported by corresponding lifting arms 54 and 55, the arm 54 being fixed on the sleeve 49 while the arm 55 is freely revoluble on the shaft 50.

The pawl 52 is provided with a rearward extension 56 in which is pivotally mounted a plunger 57 having its outer free extremity extending through a hole in a stud 58 projecting from a long link 59 connecting the shaft 53 with the link shaft 37. About the plunger 57 are washers 60 and a compression spring 61, the spring acting to throw the pawl 52 into and out of engagement with the ratchet 51. Referring now to Fig. 1, the pawl 52 is provided with a shoulder 62 which is adapted to coact with a shoulder or projection 63 on the beam 38 to automatically disengage the pawl from this ratchet when the frame 11 has reached its highest point. Substantially above the beam 38 is a cross frame member 64 (Fig. 3) which connects the side rails 30 of the frame and, to this member is secured a bracket 65 in which is revolubly mounted a shaft 66. To opposite ends of this shaft are fastened an operating lever 67 and a dog 68. This lever is connected by a forwardly extending rod 69 to a foot pedal 70 mounted on the saddle 32. The dog 68 acts to kick the pawl 52 into engagement with the ratchet 51 when the lifting mechanism is to be rendered operative in the manner to be presently described.

Referring now to the right hand portion of Fig. 2, on the top of the head 15 is pivotally mounted a dog or catch 73 which is adapted to automatically engage a corresponding projection 74 on the saddle 32 when the frame 11 reaches its raised position to retain this frame in such position, as shown in this figure. This dog may be released by means of a foot pedal 75 connected thereto. A suitable checking device as 76 which in the present embodiment is of the pneumatic type, connects the saddle 32 with the check beam 38 to prevent too rapid downward movement of the frame 11 when the dog 73 is released.

In the operation of the truck the lifting frame 11 is normally in its low position and the pawl 52 held out of engagement by the spring 61. The truck is thus free to roll along without imparting any lifting action to the frame. To cause this frame to be lifted, the operator kicks the pedal 70 backward, causing the rod 69 to swing the lever 67 (Fig. 1) rearwardly or in a counter-clockwise direction and swinging the dog 68 downwardly through the medium of the shaft 66. This movement of the dog causes it to kick the pawl 52 into engagement with the ratchet 51. During this movement of the pawl, the extension 56 carried the plunger 57 and spring 61 over center and the spring which in its previous position acted to hold the pawl out of engagement now forces it into and retains it in such engagement.

The engagement of the pawl 52 with the ratchet 51 in the manner described, causes the frame 11 to swing upwardly on the links 33 and 34 as the truck rolls forward through the medium of the sprocket 47, chain 46, sprocket 48, sleeve 49, arm 54, shaft 53 and link 59. When the frame 11 reaches its highest position, the projection 63 on the check beam 38 engages the shoulder 62 on the pawl 52, automatically tripping this pawl, and rendering the lifting mechanism inoperative. This permits the truck to continue to roll without exerting any lifting effort on the frame 11. At the time the pawl 52 was released in the manner described, the dog 73 at the front of the truck had engaged the catch projection 74 on the saddle and thus the frame was held in its raised position.

When the operator wishes to lower the frame 11, he merely operates the foot pedal 75 to release the dog 73 in the manner described and the frame will then move downwardly to its low position by gravity, too rapid downward movement being prevented by the checking device 76. The truck is free to roll during this operation as the pawl 52 remains disengaged.

The elimination of a motor or other power unit from the truck enables it to be made much shorter than would be otherwise possible for a particular size of body or carrying platform and this is a decided advantage as it enables the truck to more easily negotiate narrow aisles and small spaces. Under such conditions the truck may be disconnected from the tractor after the load is lifted and pulled by hand to any place desired. Where the tractor with truck connected cannot negotiate sharp turns because of the combined length, the truck may be temporarily disconnected from the tractor, each being conducted alone about the turn, and then connected for further transportation.

A single tractor in a factory or elsewhere may be used to operate a considerable number of these lift trucks and thus a material saving in the cost of operation is provided. Likewise, the cost of production of trucks of this type is very much less than that of trucks of like size having a motor or other power unit incorporated therein. No operation of a lifting handle is necessary to raise the body or carrying platform and thus there is a distinct saving in time and labor over the ordinary hand lift truck. The entire truck is simple, compact and durable in construction and capable of withstanding the most exacting conditions of commercial use. No time is lost in lifting the body or platform as this may be performed while the truck is in transit. Thus it will be obvious that a truck of this type may be economically produced and operated.

As many possible embodiments may be made of the above invention without departing from the scope thereof, it is to be under-

I claim:

1. In a vehicle, in combination, a main frame, supporting wheels for said frame, a lifting frame, means operable by the rolling action of the wheels for raising the lifting frame relative to the main frame, and means for retaining the lifting frame in raised position upon the completion of the raising operation.

2. In a vehicle, in combination, a main frame, supporting wheels for said frame, a lifting frame, means operable by the rolling action of the wheels for raising the lifting frame relative to the main frame, means for retaining the lifting frame in raised position upon the completion of the raising operation, and means for releasing said lifting frame from said retaining means and permitting the same to return to its low position.

3. In a vehicle, in combination, a main frame, supporting wheels for said frame, a lifting frame mounted on said main frame and movable relative thereto, mechanism actuated by the rolling action of the wheels for raising said lifting frame relative to said main frame while retaining the frames in substantialy parallel relation, and means for automatically rendering said mechanism inoperative when said lifting frame has reached its raised position and means for retaining said lifting frame in its raised position.

4. In a vehicle, in combination, a main frame, supporting wheels for said frame, a lifting frame mounted on said main frame and movable relative thereto, mechanism actuated by the rolling action of the wheels for raising said lifting frame relative to said main frame while retaining the frames in substantially parallel relation, means for automatically rendering said mechanism inoperative when said lifting frame has reached its raised position, and means for maintaining said lifting frame in its raised position and operable for releasing said lifting frame in said position and permitting it to return by gravity to its low position.

5. In a vehicle, in combination, a main frame, supporting wheels for said frame, a lifting frame mounted on said main frame and movable relative thereto, mechanism including a pawl and a ratchet actuated by the rolling action of one of said wheels for raising said lifting frame relative to said main frame, means for automatically disengaging said pawl and ratchet and rendering said mechanism inoperative when said lifting frame has reached its highest position, and a latch automatically engaging said lifting frame to retain the same in said position.

6. In a vehicle, in combination, a main frame, supporting wheels for said frame, a lifting frame, means operable by the rolling action of the wheels for raising the lifting frame relative to the main frame, means for automatically rendering said raising means inoperative when the lifting frame has reached its raised position, and means for retaining the lifting frame in raised position upon the completion of the raising operation.

7. In a lifting truck, supporting wheels therefor, a main frame, a lifting frame mounted parallel to said main frame and adapted for forward and upward movement on said main frame, power means for lifting said elevating platform operable by rotation of said supporting wheels, control means for initiating the lifting movement operable from the front end of the truck, said control means being operable upon completion of the lifting movement to release said power means, and readily releasable means operable to hold said lifting frame in its elevated position when released from said power means.

In testimony whereof, I have signed my name to this specification this 13th day of December, 1930.

WILLIAM STUEBING, Jr.